(12) United States Patent
Valio et al.

(10) Patent No.: US 12,078,912 B2
(45) Date of Patent: Sep. 3, 2024

(54) DIRECTION ADJUSTABLE DRONE ACCESSORY

(71) Applicant: Tundra Drone AS, Kautokeino (NO)

(72) Inventors: Tim Valio, Kautokeino (NO); Tor Erik Somby, Kautokeino (NO)

(73) Assignee: Tundra Drone AS, Kautokeino (NO)

( * ) Notice: Subject to any disclaimer, the term of this patent is extended or adjusted under 35 U.S.C. 154(b) by 286 days.

(21) Appl. No.: 17/756,521

(22) PCT Filed: Nov. 20, 2020

(86) PCT No.: PCT/EP2020/082816
§ 371 (c)(1),
(2) Date: May 26, 2022

(87) PCT Pub. No.: WO2021/105013
PCT Pub. Date: Jun. 3, 2021

(65) Prior Publication Data
US 2022/0411100 A1   Dec. 29, 2022

(30) Foreign Application Priority Data

Nov. 29, 2019   (NO) .................................. 20191417

(51) Int. Cl.
*G03B 15/03* (2021.01)
*B64D 47/04* (2006.01)
(Continued)

(52) U.S. Cl.
CPC ............ *G03B 15/03* (2013.01); *B64D 47/04* (2013.01); *H04N 23/51* (2023.01); *H04N 23/56* (2023.01);
(Continued)

(58) Field of Classification Search
CPC .... B64D 47/04; B64U 10/13; B64U 2101/30; G03B 15/006; G03B 15/03; G03B 17/56;
(Continued)

(56) References Cited

U.S. PATENT DOCUMENTS

| | | | |
|---|---|---|---|
| 10,220,964 B1 * | 3/2019 | Sperindeo | G06T 7/0002 |
| 2017/0248948 A1 * | 8/2017 | Otani | H04N 23/63 |

(Continued)

FOREIGN PATENT DOCUMENTS

| | | |
|---|---|---|
| CN | 106553762 A | 4/2017 |
| CN | 206863443 U | 1/2018 |

(Continued)

OTHER PUBLICATIONS

International Search Report issued in International Application No. PCT/EP2020/082816, mailed Mar. 4, 2021 (3 pages).

(Continued)

*Primary Examiner* — Amy R Hsu
(74) *Attorney, Agent, or Firm* — Osha Bergman Watanabe & Burton LLP

(57) ABSTRACT

A drone accessory adapted to be removably attached to a drone includes a directional-adjustable camera. The drone accessory includes at least one camera, a directional-adjustable device, and a processor in communication with the at least one camera and the directional-adjustable device. The at least one camera is configured to capturing images of the directional-adjustable camera of the drone and transmitting the images to the processor. The processor is configured to, in response to receiving the images of the directional-adjustable camera of the drone, determining a viewing direction of the directional-adjustable camera of the drone, and directing the directional-adjustable device in the determined viewing direction.

18 Claims, 4 Drawing Sheets

(51) Int. Cl.
*B64U 101/30* (2023.01)
*H04N 23/51* (2023.01)
*H04N 23/56* (2023.01)
*H04N 23/61* (2023.01)
*H04N 23/695* (2023.01)

(52) U.S. Cl.
CPC ........... *H04N 23/61* (2023.01); *H04N 23/695* (2023.01); *B64U 2101/30* (2023.01)

(58) Field of Classification Search
CPC ........... G03B 2215/0521; H04N 23/51; H04N 23/56; H04N 23/61; H04N 23/695
See application file for complete search history.

(56) References Cited

U.S. PATENT DOCUMENTS

| 2018/0046187 A1* | 2/2018 | Martirosyan | B64D 47/08 |
| 2019/0244385 A1* | 8/2019 | Zhao | B64C 39/024 |
| 2020/0029547 A1* | 1/2020 | Van Hecke | B64C 39/024 |
| 2020/0331403 A1* | 10/2020 | Smith | B64C 39/024 |

FOREIGN PATENT DOCUMENTS

| CN | 108445693 A | 8/2018 |
| CN | 109945082 A | 6/2019 |
| KR | 20170093579 A | 8/2017 |
| KR | 20190090551 A | 8/2019 |
| WO | 2019050342 A2 | 3/2019 |

OTHER PUBLICATIONS

Written Opinion issued in International Application No. PCT/EP2020/082816; Dated Mar. 4, 2021 (5 pages).
Search Report issued in Norwegian Application No. 20191417; Dated Jun. 26, 2020 (2 pages).

* cited by examiner

DIRECTION ADJUSTABLE DRONE ACCESSORY

TECHNICAL FIELD

The present invention relates to accessories for drones, in particular for a drone accessory adapted to be removably attached to a drone and a method of controlling the drone accessory.

BACKGROUND

Unmanned aerial vehicles (UAV), particularly in the form of quadcopters, are commonly known as drones. Drones are used for both military and civilian purposes.

Professional drones are expensive and have many advanced options, such as directional-adjustable devices following the viewing direction of a directional-adjustable camera on the drone. The directional-adjustable device may be a spotlight that automatically follows the camera direction in order to provide better picture quality when filming, photographing or navigating the drone in the dark. Professional drones are for example provided with a spotlight port for connection to an external spotlight, such that the external spotlight gets direction information from the directional-adjustable camera on the drone in order to control the motion of the external spotlight. Professional drones are also provided with advanced programmable remote controls that may control the function of external devices, such as the spotlight through accessory connections on the drone.

Consumer grade drones are not supplied with such ports and cannot use spotlights for professional drones. Hence, there are no directional-adjustable external spotlights available for consumer grade drones, instead spotlights are mounted on the drone and put in a position that is fixed while the drone is inflight. This will in turn lead to non-optimal lighting when the directional-adjustable camera on the drone changes direction.

The consumer grade drones are provided with a single remote control that controls the movement of the drone, the movement of the directional-adjustable camera and turns on/off the navigation light/pilot light of the drone. The functionality of the spotlights on consumer grade drones can therefore only be changed while on ground. Inflight it is not possible to switch the spotlights on/off or change the intensity of the spotlights.

In view of the above, the aim of the present invention is to provide a drone accessory, and a method of controlling such drone accessory, that solves or at least mitigate one or more of the above-mentioned problems related to the use of prior art spotlights for consumer drones.

SUMMARY OF THE INVENTION

In one aspect of the present invention it is provided a drone accessory adapted to be removably attached to a drone comprising a directional-adjustable camera. The drone accessory comprising at least one camera, a directional-adjustable device and a processor in communication with the at least one camera and the directional-adjustable device. The at least one camera being configured to capturing images of the directional-adjustable camera of the drone and transmitting the images to the processor, and the processor being configured to, in response to receiving the images of the directional-adjustable camera of the drone, determining a viewing direction of the directional-adjustable camera of the drone, and directing the directional-adjustable device in the determined viewing direction.

In some embodiments, the processor is determining a change in the viewing direction of the directional-adjustable camera by tracking the position of the directional-adjustable camera of the drone in consecutive images. In some embodiments, the processor is tracking a marker removably attached to the directional-adjustable camera of the drone.

In some embodiments, the drone accessory is further comprising a light sensor adapted to be removably attached in proximity of a navigation light of the drone. The light sensor being configured to detect light from the navigation light and transmitting light data to the processor, and the processor being configured to, in response to receiving the light data from the light sensor, controlling a function of the directional-adjustable device.

In some embodiments, the drone accessory is further comprising a drive device in communication with the processor, the drive device being configured to moving the directional-adjustable device in response to instructions from the processor to directing the directional-adjustable device in the determined viewing direction. The drive device may be one of a servo, a brush motor, a brushless motor, a gimbal, a stepper motor, a pneumatic driver or a hydraulic driver.

In some embodiments, the directional-adjustable device is comprising an array of fixed devices in communication with the processor, the processor being configured to activate at least one on the devices for directing the directional-adjustable device in the determined viewing direction.

The directional-adjustable device may be one of a spotlight, a loudspeaker, a microphone, a laser, a sonar, an infrared light, an object launcher, a gas sensor, a temperature sensor, a thermal camera, or a fluid dispenser.

In some embodiments, the at least one camera, the processor and the directional-adjustable device is assembled in a single assembly removably attachable to the drone.

In some embodiments, the processor and the directional-adjustable device is assembled in a single assembly removably attachable to the drone, and the at least one camera is removably attachable to a position on the drone distal to the single assembly. In some embodiments, the distal position on the drone is in proximity of a navigation light of the drone.

In some embodiments, the drone accessory has no functional connection to the drone.

In a second aspect of the present invention it is provided a method of controlling a drone accessory adapted to be removably attached to a drone comprising a directional-adjustable camera, the drone accessory comprising at least one camera, a directional-adjustable device and a processor in communication with the at least one camera and the directional-adjustable device. The method comprising capturing, with the at least one camera, images of the directional-adjustable camera, and transmitting the images to the processor. Determining, with the processor, a viewing direction of the directional-adjustable camera of the drone in response to receiving the images of the directional-adjustable camera of the drone, and directing, with processor, the directional-adjustable device in the determined viewing direction.

In some embodiments, determining a change in the viewing direction of the directional-adjustable camera further comprising tracking the position of the directional-adjustable camera in consecutive images. The step of tracking the position of the directional-adjustable camera in consecutive images may further comprising tracking a marker removably attached to the directional-adjustable camera of the drone.

In some embodiments, the method further comprising detecting, with a light sensor in proximity of a navigation light of the drone, light from the navigation light, and transmitting light data to the processor, and controlling, with the processor, a function of the directional-adjustable device in response to receiving the light data from the light sensor.

In some embodiments, the step of directing the directional-adjustable device in the determined viewing direction further comprising instructing a drive device to moving the directional-adjustable device.

In some embodiments, the step of directing the directional-adjustable device in the determined viewing direction further comprising activating at least one of an array of fixed devices.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
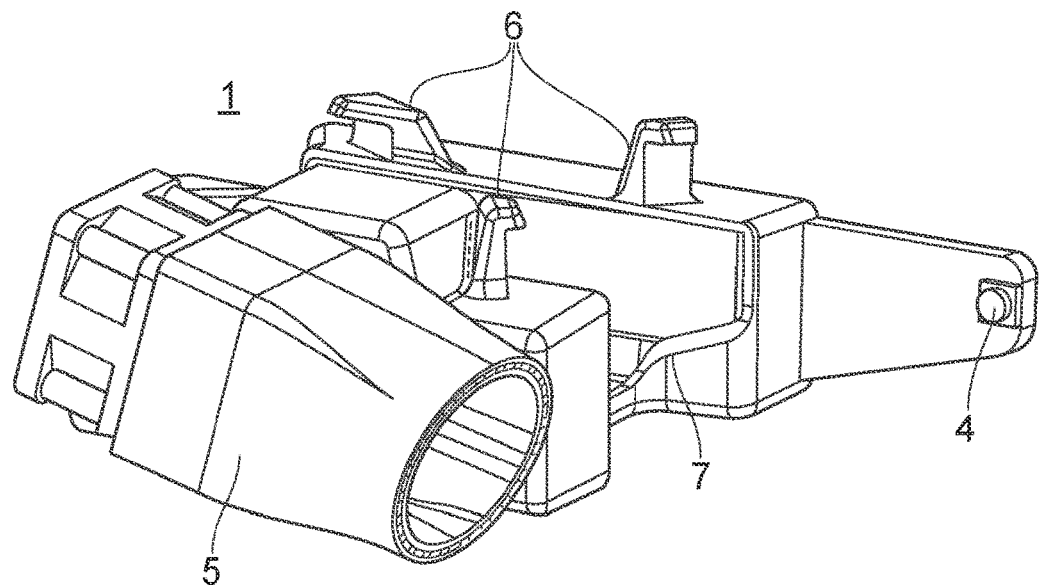
FIG. 1 is a perspective view of an exemplary drone accessory according to the invention.

In the following, different alternatives will be discussed in more detail with reference to the appended drawings. It should be understood, however, that the drawings are not intended to limit the scope of the invention to the subject-matter depicted in the drawings. The scope of the invention is defined in the appended claims.

In the exemplary embodiments, various features and details are shown in combination. The fact that several features are described with reference to a particular example should not be construed as implying that those features be necessity have to be included together in all the embodiments of the invention. Conversely, features that are described with reference to different embodiments should not be construed as mutually exclusive. As those skilled in the art will readily understand, embodiments that incorporate any subset of features described herein and that are not expressly interdependent have been contemplated by the inventor and are part of the intended disclosure. However, explicit descriptions of all such embodiments would not contribute to the understanding of the principles of the invention, and consequently some permutations have been omitted for the sake of simplicity.

Figure 2:
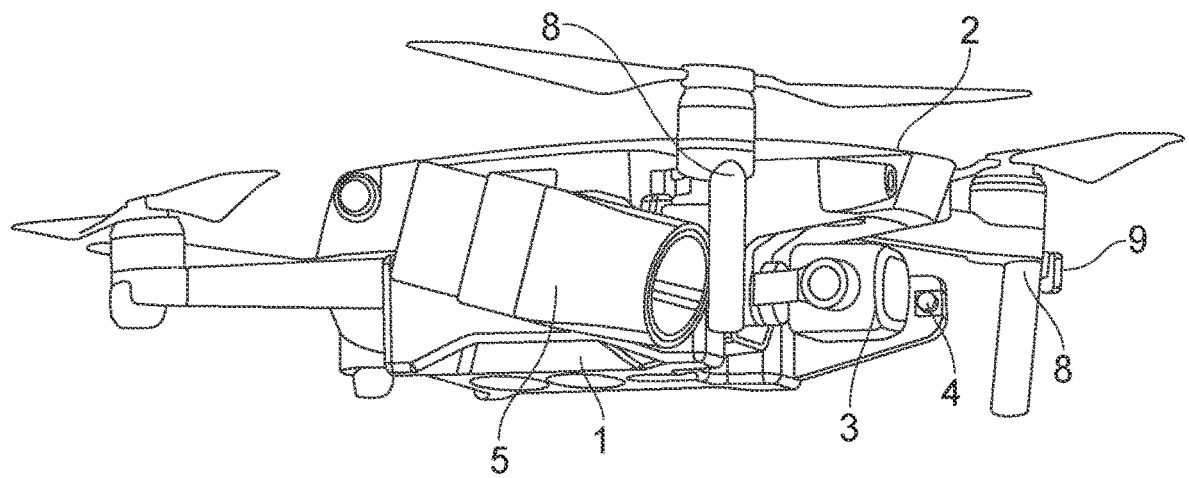
FIG. 2 is a perspective view of the drone accessory of FIG. 1 removably attached to a drone.

FIG. 1 is a perspective view of an exemplary drone accessory 1 according to the present invention. The drone accessory 1 is adapted to be removably attached to a drone 2 comprising a directional-adjustable camera 3, as illustrated in FIG. 2. The drone accessory 1 may be releasably attached to the drone with snap-on connectors 6, or other suitable connector means.

The drone accessory 1 is comprising at least one camera 4, a directional-adjustable device 5 and a processor (not shown) in communication with the at least one camera 4 and the directional-adjustable device 5. The at least one camera 4 is configured to capture images of the directional-adjustable camera 3 of the drone 2 and transmitting the images to the processor. The at least one camera 4 is in this exemplary embodiment positioned next to the directional-adjustable camera 3. The processor may be positioned in a drone accessory body 7. The processor is further configured, in response to receiving the images of the directional-adjustable camera 3 of the drone, to determine a viewing direction of the directional-adjustable camera 3 of the drone, and direct the directional-adjustable device 5 in the determined viewing direction. The directional-adjustable device 5 may then automatically follow the directional-adjustable camera 3 to optimize the function of the direction-adjustable device 5. The tracking of the directional-adjustable camera 3 does not require any functional connection to the drone 2, hence the drone accessory 1 may work with most drones on the market without any modifications of the drones.

In the exemplary embodiment illustrated in FIG. 1 and FIG. 2, the directional-adjustable device 5 is a spotlight. The spotlight may be a high-power light unit, e.g. 12 000 lumens, provided with a reflector and cooling rib. Other exemplary directional-adjustable devices 5 comprises a loudspeaker, a microphone, a laser, a sonar, an infrared light or an object launcher.

In one embodiment, the processor may determine a change in the viewing direction of the directional-adjustable camera 3 by tracking the position of the directional-adjustable camera 3 of the drone 2 in consecutive images. The tracking may be performed using various image recognition techniques. In one embodiment, the processor may track a marker removably attached to the directional-adjustable camera 3 of the drone 2. This may make the tracking easier, hence faster and more accurate.

The drone 2 is provided with navigation/pilot lights 8 for a drone pilot to see the drone when flying in darkness. The navigation lights 8 can be switched on/off using the drone remote control. In one embodiment, as illustrated in FIG. 2, the drone accessory 1 may further comprise a light sensor 9 adapted to be removably attached in proximity of a navigation light 8 of the drone 2. The light sensor 9 is configured to detect light from the navigation light 8 and transmit the light data to the processor. The processor is configured, in response to receiving the light data from the light sensor 9, to control a function of the directional-adjustable device 5. In the simplest form, switching the navigation light 8 on/off, may turn the directional-adjustable device on/off or vice-versa. As the navigation light 8 on/off is constitutes a binary signal, switching the navigation light 8 on/off in predetermined sequences and/or frequencies, the processor may interpret other control functions, such as increasing/decreasing the intensity of a spot light, the sensitivity of a microphone, the volume of a loudspeaker, or launch an object etc.

In one embodiment, the drone accessory 1 may further comprise a drive device (not shown) in communication with the processor. The drive device may be positioned within the drone accessory body 7 or within the directional-adjustable device 5. The drive device is configured to physically move the directional-adjustable device 5 in response to instructions from the processor to directing the directional-adjustable device 5 in the determined viewing direction. In an exemplary embodiment, the drive may be a servo, a brush motor, a brushless motor, a gimbal, a stepper motor, a pneumatic driver or a hydraulic driver.

In another embodiment, the drone accessory 1 is not physically moved to direct the directional-adjustable device 5 in the determined viewing direction. Instead, the directional-adjustable device 5 comprises an array of fixed devices in communication with the processor, and the processor is configured to activate at least one of the devices for directing the directional-adjustable device 5 in the determined viewing direction. In one example, the spotlight may comprise an array of light diodes arranged in a semi-arch and activating the light diode(s) pointing in the direction of the viewing direction. In other examples, the direction-adjustable device 5 may comprise a beamforming microphone array to direct the sensitivity of the microphone in the direction of the viewing direction, or a speaker element array to direct a sound beam in the direction of the viewing direction.

In one embodiment, as illustrated in FIG. 2, the at least one camera 4, the processor and the directional-adjustable device 5 is assembled in a single assembly removably attachable to the drone. The single assembly may comprise a drone accessory body 7. The drone accessory body 7 may be provided with snap-on connectors 6, or other suitable connector means, for removably attaching the drone accessory 1 on the drone 2. The drone accessory body may further comprise at least one battery for supplying power to the processor, the at least one camera 4 and the directional-adjustable device 5. The at least one battery may be an integrated, rechargeable battery or a replaceable battery.

Figure 3:
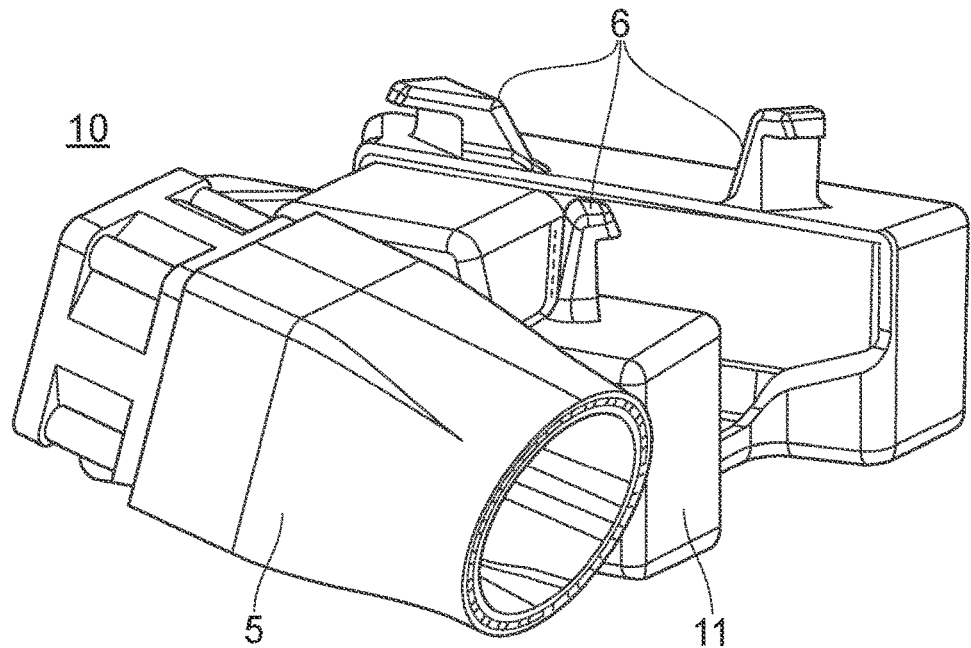
FIG. 3 is a perspective view of another exemplary drone accessory according to the invention.
Figure 4:
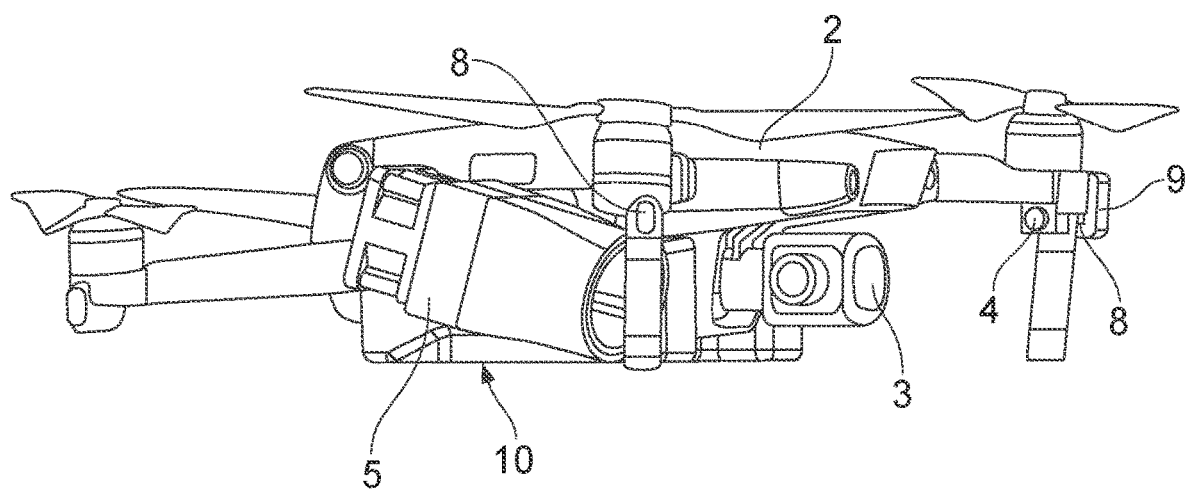
FIG. 4 is a perspective view of the drone accessory of FIG. 3 removably attached to a drone.

FIG. 3 and FIG. 4 show perspective views of another exemplary embodiment of the drone accessory 10 according to the present invention. This embodiment is identical to the drone accessory 1 discussed above with reference to FIG. 1 and FIG. 2, except for that the at least one camera 4 is removably attached to a position on the drone distal to a single assembly comprising the processor and the directional-adjustable device 5. The single assembly is removably attachable to the drone 2, for example by snap-on connectors 6 provided on a drone accessory body 11. In one embodiment, as illustrated in FIG. 4, the distal attachment position of the drone is in proximity of one of the navigation lights 8 of the drone. The at least one camera 4 may be assembled in a single assembly. The drone accessory body 11 may further comprise at least one battery for supplying power to the processor, the at least one camera 4 and the directional-adjustable device 5. In one alternative, the at least one camera 4 and/or the light sensor 9 may be provided with a battery to power the at least one camera 4 and/or the light sensor, and a wireless communication unit to allow for wireless communication with the processor.

In one embodiment, the drone accessory 1, 10 may comprise two or more cameras 4 positioned on different locations on the drone 2, e.g. a first camera next to the directional-adjustable camera 3 of the drone and a second camera in proximity of the light sensor 9, or a first camera next to the directional-adjustable camera 3 in horizontal direction and a second camera next to the directional-adjustable camera 3 in a vertical direction.

In one embodiment, the processor may track movement of the directional-adjustable camera 3 both horizontally and vertically, and the directional-adjustable device 5 may be directional-adjustable in both horizontal and vertical directions to follow the viewing direction of the directional-adjustable camera 3 in all directions. For tracking horizontal movement of the directional-adjustable camera 3 it may be advantageous to position one of the two or more cameras 4 at least partially above the directional-adjustable camera 3.

Figure 5A:
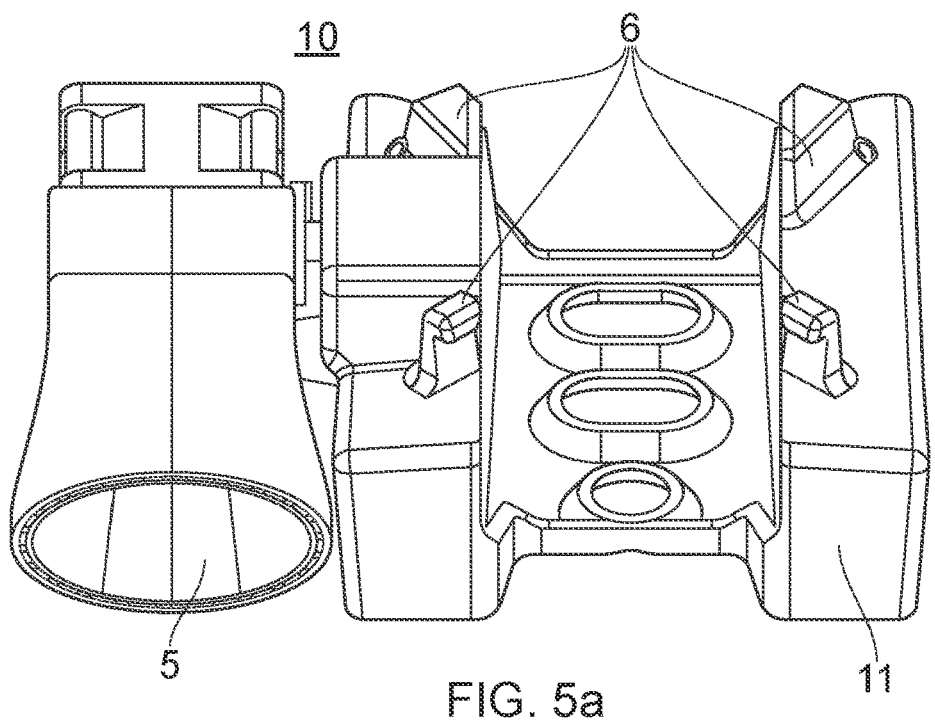
FIG. 5a is another perspective view of the drone accessory of FIG. 3.
Figure 5B:
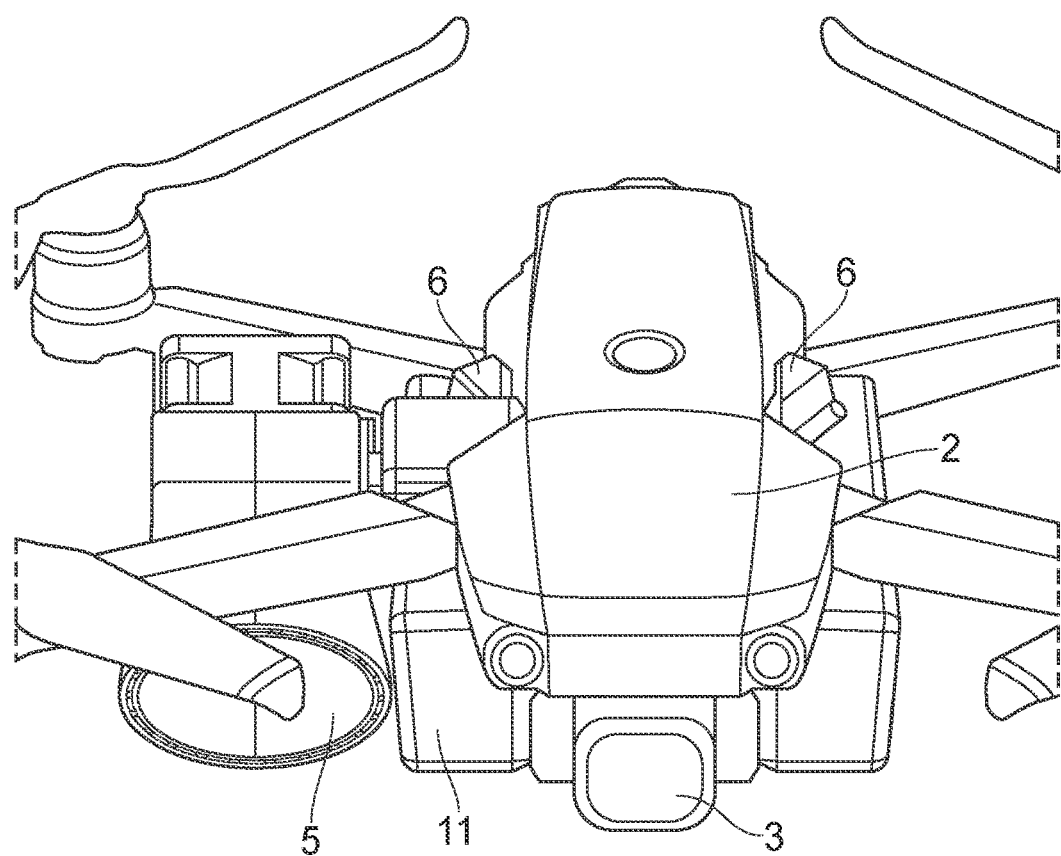
FIG. 5b is another perspective view of the drone accessory of FIG. 3 removably attached to a drone.

FIG. 5a shows a perspective view from above of the drone accessory 10. FIG. 5b illustrates how the snap-on connectors 6 connects to the drone 2 to releasably attach the drone accessory 10 to the drone 2. The snap-on connectors 6, or similar attachment means, together with the drone accessory body 7, 11 are customized for the specific drone model to make a perfect fit. The position of the directional-adjustable device 5 may also be customized for the specific drone to align the directional-adjustable device 5 with the directional-adjustable camera 3 of the drone 2. The layout of the drone accessory body 7, 11 may also be optimized for the specific drone to maintain the correct weight balance of the drone.

Figure 6:
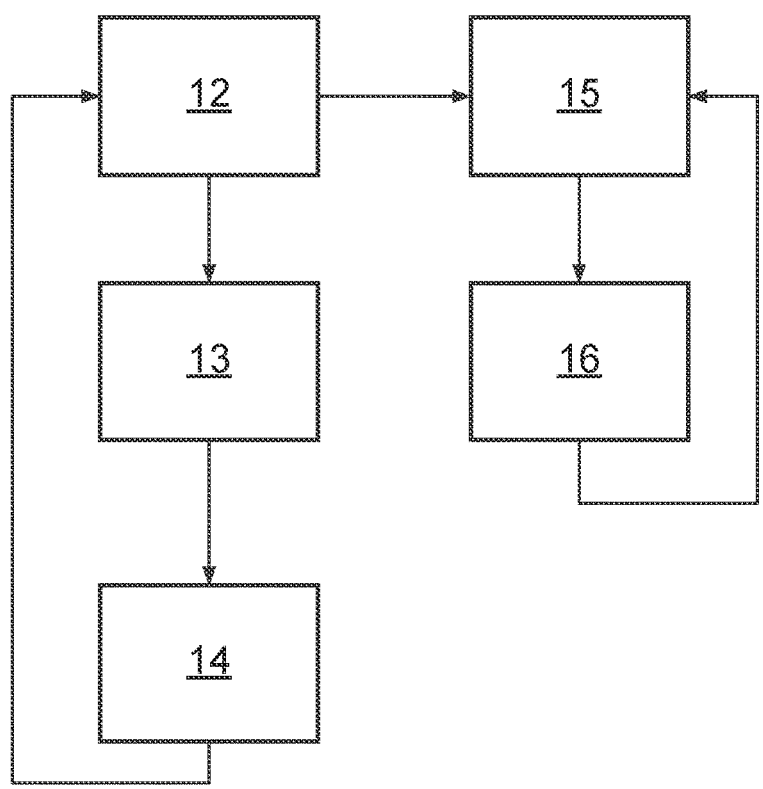
FIG. 6 is a flow chart of an exemplary method according to the invention.

FIG. 6 illustrates a flow chart of an exemplary method of controlling a drone accessory according to the present invention. In a first step 12, images of a directional-adjustable camera of a drone is captured with at least one camera and transmitted to a processor. In a next step 13, the processor determines a viewing direction of the directional-adjustable camera of the drone in response to receiving the images of the directional-adjustable camera of the drone. In a next step 14, the processor directs a directional-adjustable device in the determined viewing direction.

In one embodiment, the step of determining a change in the viewing direction of the directional-adjustable camera may further comprise tracking the position of the directional-adjustable camera in consecutive images.

In one embodiment, the step of tracking the position of the directional-adjustable camera in consecutive images may further comprise tracking a marker removably attached to the directional-adjustable camera of the drone.

In one embodiment, the step of directing the directional-adjustable device in the determined viewing direction may further comprise instructing a drive device to moving the directional-adjustable device.

In one embodiment, the step of directing the directional-adjustable device in the determined viewing direction may further comprise activating at least one of an array of fixed devices In one embodiment, the method further comprises a step 15, where light from a navigation light of the done is detected with a light sensor in proximity of the navigation light, light data is transmitted to the processor. In a next step 16, the processor controls a function of the directional-adjustable device in response to receiving the light data from the light sensor.

The invention claimed is:

1. A drone accessory adapted to be removably attached to a drone comprising a directional-adjustable camera, the drone accessory comprising at least one camera, a directional-adjustable device and a processor in communication with the at least one camera and the directional-adjustable device, wherein
    the at least one camera being configured to capturing images of the directional-adjustable camera of the drone and transmitting the images to the processor, and
    the processor being configured to, in response to receiving the images of the directional-adjustable camera of the drone, determining a viewing direction of the directional-adjustable camera of the drone, and directing the directional-adjustable device in the determined viewing direction.

2. The drone accessory according to claim 1, wherein the processor is determining a change in the viewing direction of the directional-adjustable camera by tracking the position of the directional-adjustable camera of the drone in consecutive images.

3. The drone accessory according to claim 2, wherein the processor is tracking a marker removably attached to the directional-adjustable camera of the drone.

4. The drone accessory according to claim 1, further comprising a light sensor adapted to be removably attached in proximity of a navigation light of the drone, wherein
the light sensor being configured to detect light from the navigation light and transmitting light data to the processor, and
the processor being configured to, in response to receiving the light data from the light sensor, controlling a function of the directional-adjustable device.

5. The drone accessory according to claim 1, further comprising a drive device in communication with the processor, the drive device being configured to moving the directional-adjustable device in response to instructions from the processor to directing the directional-adjustable device in the determined viewing direction.

6. The drone accessory according to claim 5, wherein the drive device is one of a servo, a brush motor, a brushless motor, a gimbal, a stepper motor, a pneumatic driver or a hydraulic driver.

7. The drone accessory according to claim 1, wherein the directional-adjustable device comprises an array of fixed devices in communication with the processor, the processor being configured to activate at least one on the devices for directing the directional-adjustable device in the determined viewing direction.

8. The drone accessory according to claim 1, wherein the directional-adjustable device is one of a spotlight, a loudspeaker, a microphone, a laser, a sonar, an infrared light, an object launcher, a gas sensor, a temperature sensor, a thermal camera, or a fluid dispenser.

9. The drone accessory according to claim 1, wherein the at least one camera, the processor and the directional-adjustable device is assembled in a single assembly removably attachable to the drone.

10. The drone accessory according to claim 1, wherein the processor and the directional-adjustable device is assembled in a single assembly removably attachable to the drone, and the at least one camera being removably attachable to a position on the drone distal to the single assembly.

11. The drone accessory according to claim 10, wherein the distal position on the drone is in proximity of a navigation light of the drone.

12. The drone accessory according to claim 1, wherein the drone accessory has no functional connection to the drone.

13. Method of controlling a drone accessory adapted to be removably attached to a drone comprising a directional-adjustable camera, the drone accessory comprising at least one camera, a directional-adjustable device and a processor in communication with the at least one camera and the directional-adjustable device, the method comprising the steps of:
capturing, with the at least one camera, images of the directional-adjustable camera, and transmitting the images to the processor,
determining, with the processor, a viewing direction of the directional-adjustable camera of the drone in response to receiving the images of the directional-adjustable camera of the drone, and
directing, with the processor, the directional-adjustable device in the determined viewing direction.

14. The method according to claim 13, wherein determining a change in the viewing direction of the directional-adjustable camera further comprising tracking the position of the directional-adjustable camera in consecutive images.

15. The method according to claim 14, wherein tracking the position of the directional-adjustable camera in consecutive images further comprising tracking a marker removably attached to the directional-adjustable camera of the drone.

16. The method according to claim 13, further comprising:
detecting, with a light sensor in proximity of a navigation light of the drone, light from the navigation light, and transmitting light data to the processor, and
controlling, with the processor, a function of the directional-adjustable device in response to receiving the light data from the light sensor.

17. The method according to claim 13, wherein directing the directional-adjustable device in the determined viewing direction further comprising instructing a drive device to moving the directional-adjustable device.

18. The method according to claim 13, wherein directing the directional-adjustable device in the determined viewing direction further comprising activating at least one of an array of fixed devices.

* * * * *